Dec. 14, 1948.  G. I. SHELTON ET AL  2,456,220
AUTOMOBILE SERVICE TABLE
Filed Jan. 7, 1947
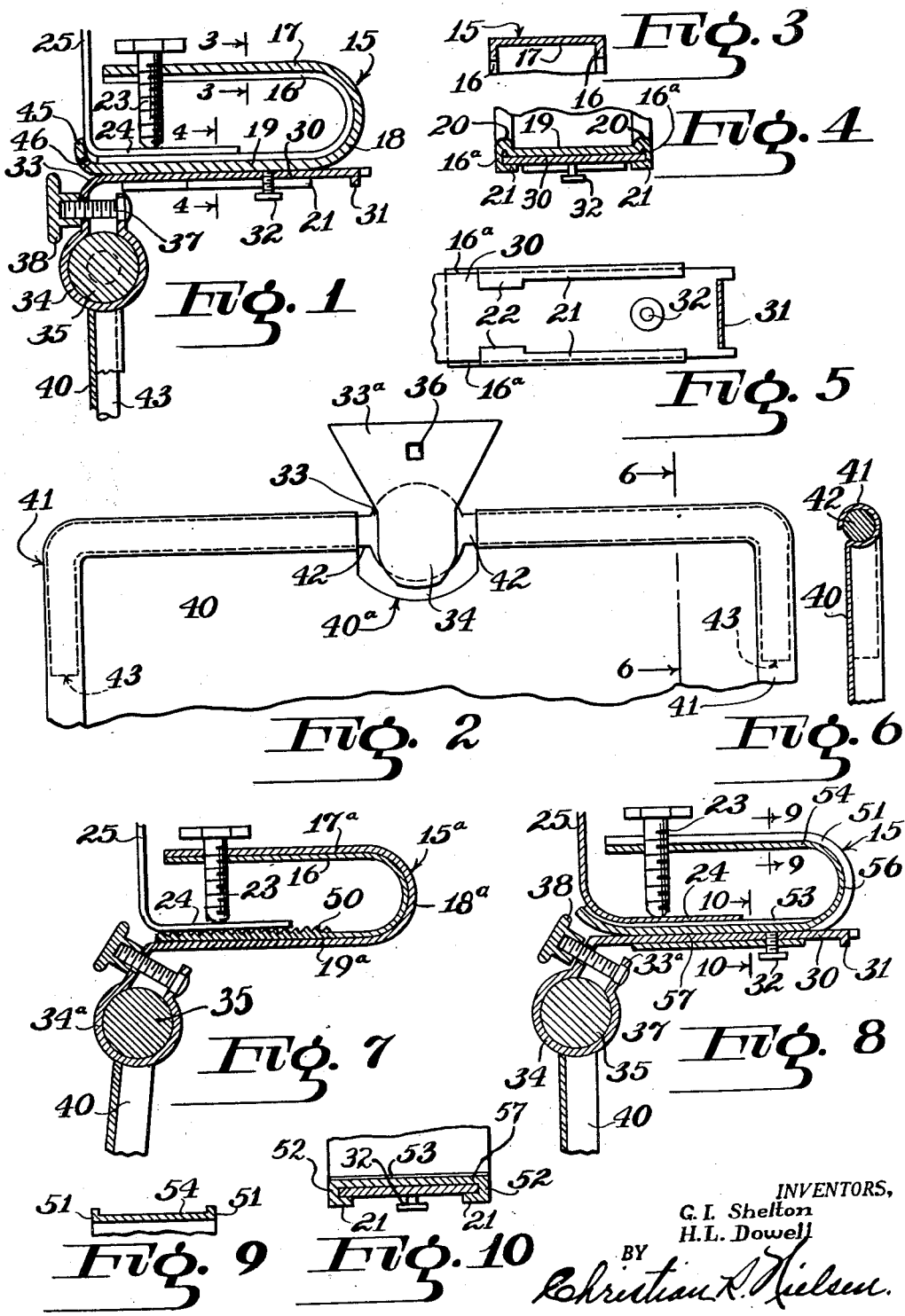
INVENTORS,
G. I. Shelton
H. L. Dowell
BY
Christian A. Nielsen
ATTORNEY Patented Dec. 14, 1948

2,456,220

UNITED STATES PATENT OFFICE 2,456,220

AUTOMOBILE SERVICE TABLE

George I. Shelton and Henry L. Dowell, Athens Tex.

Application January 7, 1947, Serial No. 720,640

3 Claims. (Cl. 311—21)

This invention relates to service tables for use in automobiles, on tables, desks and the like.

An object of the invention is the provision of a service table that may be attached removably to an instrument panel of an automobile, said table being movable readily from an operative to an in operative position and vice versa, the leaf of the table being slidably mounted on the connections between said leaf and the panel so that the leaf may be adjusted when in a horizontal position toward or away from an occupant in the automobile.

Another object of the invention is the provision of a table which may be attached to or readily removed from the instrument panel of an automobile or which may be employed for providing quick service in hotels, restaurants or other establishments, said table including a leaf and connections between said leaf and a stable support in a vehicle, or in a building, said leaf having a frictionally hinged attachment with the connections so that the leaf may be adjusted from a horizontal to various angular positions relative to the horizontal, a slidable mounting permitting adjustment of the leaf toward or away from the user of the table.

A further object of the invention is the provision of a removable service table for temporary use in vehicles, restaurants or other establishments, a leaf and attachments between said leaf and a support constituting broadly the main elements of the service table, the attachments including a U-shaped member adapted to receive said support and clamp said attachments to the support for retaining in position the leaf which is connected by a friction hinge with the attachment, there being a slide mounted on an arm of the U-shaped member and forming part of the friction hinge for adjustably positioning the leaf toward or away from the user.

The invention consists in the novel construction, arrangement and combinations of parts hereinafter more particularly described.

In the drawings:

Figure 1 is a transverse vertical section of a service table shown applied to an instrument panel of a vehicle.

Figure 2 is a front view in elevation of the service table located in a lowered or inoperative position.

Figure 3 is a fragmentary transverse vertical section taken along the line 3—3 of Fig. 1.

Figure 4 is a fragmentary transverse vertical section taken along the line 4—4 of Figure 1.

Figure 5 is a fragmentary bottom plan view of a slide mounted in the bottom of a U-shaped clamping member.

Figure 6 is a fragmentary transverse vertical section taken along the line 6—6 of Figure 2.

Figure 7 is a transverse vertical section similar to the section shown in Figure 1, but disclosing a modified form.

Figure 8 is a transverse vertical section similar to the section shown in Figure 1 but disclosing a further modified form.

Figure 9 is a transverse vertical section taken along the line 9—9 of Figure 8, and Figure 10 is a transverse vertical section taken along the line 10—10 of Figure 8.

Referring more particularly to Figures 1 to 6 inclusive, 15 designates a U-shaped clamp which is formed of a flat strip of metal with the side edges bent downwardly to provide stiffening flanges 16 on the upper arm 17 and on the bight portion 18. As shown in Figure 4, the flanges 16—a on the lower arm 19 are bent upwardly at 20 and then downwardly and then inwardly at 21 in spaced relation with the arm 19 as shown in Figure 5. The inturned portions 21 of the flanges 16—a have each a lug 22 for a purpose which will be presently explained. A thumbscrew 23 threaded into an opening in the arm 17 is adapted to engage a flange 24 on the lower edge of an instrument panel 25 of an automobile.

A slide 30 is received between the underface of the arm 19 of the yoke 15 and the inturned portions 21 on the flanges 16—a which project downwardly from the arm 19. One end of the slide 30 has a depending lug 31 adapted to engage the lugs 22 to prevent the slide from becoming disengaged from the arm 19. A set screw 32 is threaded into an opening in the slide 30 for engagement with the arm 19 for retaining said slide in position.

A strap 33 depends from the inner end of the slide 30 and is bent intermediate the ends thereof to form a socket 34 to receive a ball 35. The free end 33—a of the strap has a square opening 36 to receive a square portion of a threaded bolt 37 which passes through an opening in the strap 33 where a nut 38 is screwed onto the bolt for drawing the socket 34 tight against the ball 35.

A leaf 40, rectangular in shape has a curled edge 41 the upper edge of which together with portions of the sides receive rods 42 radiating from the ball 35. The ends of the rods are bent downwardly as shown at 43, and are received by the curled side edges of the tray or leaf 40. The leaf is cut away at 40—a for the reception of the ball 35 and socket 34.

The tray is shown in a lowered or inoperative position. In order to raise the tray to a horizontal position, the nut 38 is loosened and the tray is raised, after which the nut is tightened. The tray is then in place to serve an occupant of the car.

The free end 45 of the arm 19 of the U-shaped clamp 15 has a threaded opening 46 into which may be threaded a set screw (not shown). The set screw may be used if it is found that the screw 23 does not retain the clamp 15 in place.

Referring more particularly to Figure 7, a modified form of the serving table is disclosed. In this form, the slide 30 of Figure 1 is omitted and the lower arm 19—a of the yoke 15—a is extended to form the socket to receive the ball 35.

The arms 17—a and 19—a and the bight portion 18—a of the clamp 15—a have inturned flanges 16 at the side edges thereof. The flanges on the arm 19—a have teeth 50 for engagement with the underface of the flange 24 on the instrument panel 25 so that when the bolt 23 is screwed inwardly the teeth will grip the flange 24 more firmly.

In view of the fact that all the other parts illustrated and not referred to are identical with similarly positioned elements in Figures 1 and 6 inclusive, the same reference numerals are employed to indicate such elements.

Referring more particularly to Figures 8 to 10 inclusive, it will be seen that a further modified form of the invention is illustrated. This construction is substantially the same as the table shown in Figures 1 to 6, except the flanges 51 and 52 and a strip of rubber or fabric 53. Flanges 51 project outwardly of the side edges of the arm 54 and the connecting bight portion 56 of the clamp 15—a. The flanges 52 project outwardly and downwardly from the side edges of the arm 57 with the free edges 21 of said flanges being bent under the slide 30.

The strip of fabric or rubber 53 is attached to the upper face of the arm 57 of the clamp and is adapted to contact one face of the inturned flange 24 of the instrument panel 25. This strip 53 replaces the teeth 50 in Figure 7 and the upwardly bent portions 20 of the flange 16—a, of Figure 1, and will protect the surface of the flange 24 from being marred.

In view of the fact that the other elements of service table illustrated in Figures 8 to 10 inclusive are identical with similarly positions elements in Figure 1, the same reference numerals are employed for the identical elements in both forms. Furthermore, the clamps 15 and 15—b are secured in place on the panel 25 by the screw 23 while the tray or leaf 40 is held in position after adjustment by tightening the nut 38 in either construction.

The flanges 16—a and the inturned members 21 on the arm 19 of the clamp 15 in Figure 1 and the flanges 52 and the cooperating member 21 on the arm 57 in Figure 8 for guides for the slidable members 30.

Although a preferred and practical embodiment of the invention is disclosed herein, it is to be understood that various modifications may be made within the scope of the appended claims.

We claim:

1. A service table comprising a tray, a slidable member, one end of the slidable member being an extension, said extension being bent to provide a U-shaped member forming a socket, a guide for the slidable member, means for removably attaching the guide to a support, a ball received by the socket, the tray having fixed connection with the ball, means cooperating with the legs of the U-shaped member for clamping said legs rigidly against the ball for adjustably positioning the tray in a horizontal or vertical position, and means for retaining the slidable member in an adjusted position in the guide.

2. A service table comprising a clamp for attachment to a support, one arm of the clamp having a guide thereon, a slide mounted in the guide, a socket depending from one end of the slide, a ball received by the socket, means for tightening the socket on the ball, a rectangular tray having the opposite edges rolled, rods projecting from diametrically opposite points on the ball and received by the rolled edge along one end of the tray, the ends of the rod being angularly disposed and received within the rolled portions of the side edges of the tray, and means for retaining the slidable member in position.

3. A service table comprising a tray having a ball member fixed to one edge thereof, a U-shaped clamp providing upper and lower arms, the upper arm including means for securing the tray to a support, the lower arm of said clamp having inturned parallel guide flanges, a slide member positioned between said guide flanges, a socket on one end of said slide member and adjustably receiving the ball member of the tray, spaced lugs at one end of the flanges and in engagement with one face of the slide member, a depending lip on one end of the slide member, and engageable with the lugs on the guide member for limiting outward movement of the slide member and means for retaining the slide member in an adjusted position in the guide flanges.

GEORGE I. SHELTON.
HENRY L. DOWELL.

REFERENCES CITED

The following references are of record in the file of this patent:

UNITED STATES PATENTS

| Number | Name | Date |
|---|---|---|
| 600,642 | Hartman | Mar. 15, 1893 |
| 688,230 | Isgrig et al. | Dec. 3, 1901 |
| 1,518,956 | Beitman | Dec. 9, 1924 |
| 1,630,889 | Clarke | May 31, 1927 |
| 1,867,276 | McIntyre | July 12, 1932 |
| 1,946,967 | Douglas | Feb. 13, 1934 |
| 2,270,948 | Howe | Jan. 27, 1942 |
| 2,292,797 | Roberts | Aug. 11, 1942 |